United States Patent
Lee et al.

(10) Patent No.: US 12,216,788 B2
(45) Date of Patent: Feb. 4, 2025

(54) META-ESTIMATION OF BLOOM FILTERS WITH VECTORS OF COUNTS

(71) Applicant: Google LLC, Mountain View, CA (US)

(72) Inventors: Preston Wooju Lee, Bellevue, WA (US); Craig William Wright, Louisville, CO (US); Joseph Sean Cahill Goodknight Knightbrook, Santa Monica, CA (US); Evgeny Skvortsov, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 17/917,083

(22) PCT Filed: Oct. 5, 2021

(86) PCT No.: PCT/US2021/053467
§ 371 (c)(1),
(2) Date: Oct. 5, 2022

(87) PCT Pub. No.: WO2022/076342
PCT Pub. Date: Apr. 14, 2022

(65) Prior Publication Data
US 2023/0153454 A1    May 18, 2023

(51) Int. Cl.
*G06F 21/60*    (2013.01)
*G06F 21/62*    (2013.01)

(52) U.S. Cl.
CPC .......... *G06F 21/6227* (2013.01); *G06F 21/60* (2013.01)

(58) Field of Classification Search
CPC ....... G06F 21/6227; G06F 21/60; G06F 21/62
See application file for complete search history.

(56) References Cited

U.S. PATENT DOCUMENTS

2008/0154852 A1* 6/2008 Beyer ................. G06F 12/0864
711/170
2019/0190938 A1* 6/2019 Oba ........................ H04L 43/16
(Continued)

FOREIGN PATENT DOCUMENTS

CA    2997922 C   * 10/2022    ......... G06F 16/2255
CN    118316857 A  *  7/2024
(Continued)

OTHER PUBLICATIONS

Anonymous, "The Private Cardinality Estimation Framework", Cardinality_Estimation_Evaluation_Framework/src/estimators/meta_estimators.py, 3 pages.
(Continued)

*Primary Examiner* — Jayesh M Jhaveri
(74) *Attorney, Agent, or Firm* — DORITY & MANNING P.A.

(57) ABSTRACT

Systems and methods for the meta-estimation of data structures representing identifiers are disclosed. The system maintain one or more data records comprising one or more identifiers and one or more attributes. Using the data records, the system can generate a first data structure, such as a probabilistic data structure, that represents the plurality of data records. The first data structure can have a plurality of registers. The system can identify a subset of the plurality of registers that are equal to a predetermined value, and generate a second data structure that represents the subset of the plurality of registers. The system can then store the second data structure as a meta-estimation of the first, and can utilize the second data structure in further processing operations.

20 Claims, 7 Drawing Sheets

(56) References Cited

U.S. PATENT DOCUMENTS

| | | | | |
|---|---|---|---|---|
| 2019/0347335 A1* | 11/2019 | Kohlschuetter | ....... | G06F 16/958 |
| 2020/0257684 A1* | 8/2020 | Erlandson | ............ | G06F 16/2255 |
| 2021/0191911 A1* | 6/2021 | Ponnala | ................ | H04L 9/0643 |
| 2023/0108083 A1* | 4/2023 | Ramabaja | ................. | H04L 9/50 |
| | | | | 705/75 |

FOREIGN PATENT DOCUMENTS

| | | | | |
|---|---|---|---|---|
| FR | 2988944 A1 * | 10/2013 | ............. | G06F 16/27 |
| WO | WO-2024086143 A1 * | 4/2024 | | |

OTHER PUBLICATIONS

International Search Report and Written Opinion for PCT/US2021/053467, mailed on Jan. 27, 2022, 17 pages.

Peng et al., "Privacy-centric Cross-Publisher Reach and Frequency Estimation via Vector of Counts", 2021, 38 pages.

International Preliminary Report on Patentability for Application No. PCT/US2021/053467, mailed Apr. 20, 2023, 11 pages.

\* cited by examiner

META-ESTIMATION OF BLOOM FILTERS WITH VECTORS OF COUNTS

RELATED APPLICATIONS

This application is based upon and claims the right of priority under 35 U.S.C. § 371 as a nationalization of International Application No. PCT/US2021/053467, filed Oct. 5, 2021. International Application No. PCT/US2021/053467 is hereby incorporated by reference herein in its entirety. International Application No. PCT/US2021/053467 claims priority to and the benefit of U.S. Provisional Patent Application Ser. No. 63/087,791, filed Oct. 5, 2020. U.S. Provisional Patent Application Ser. No. 63/087,791 is hereby incorporated by reference herein in its entirety.

BACKGROUND

In many instances, computing and data analysis systems may determine the intersection, or union, of large sets of data as part of analysis or processing of the data. Computing the union, intersection, or frequency of large sets of data distributed across multiple sources typically involves sharing information about the large sets of data between the multiple sources. Information from each source can include private or protected information, and sharing such information may negatively impact privacy and security.

SUMMARY

At least one aspect of the present disclosure relates to a method for meta-estimation of data structures representing identifiers. The method can include maintaining a plurality of data records including one or more identifiers and one or more attributes. The method can include generating a first data structure that represents the plurality of data records. The first data structure can have a plurality of first registers. At least one of the plurality of first registers can be populated based on hashes of each of the plurality of identifiers. The method can include identifying a subset of the plurality of first registers that are equal to a predetermined value. Each of the subset of the plurality of first registers can be identified by an index value. The method can include generating a second data structure that represents the subset of the plurality of first registers. The second data structure can have a plurality of second registers. At least one of the plurality of second registers can be populated based on hashes of the index values of each of the subset of the plurality of first registers. The method can include storing, in a memory, the second data structure that represents the subset of the plurality of first registers.

In some implementations of the method, it can include retrieving a third data structure having a plurality of third registers. In some implementations of the method, each of the plurality of third registers can be corresponding to a respective one of the plurality of second registers of the second data structure. In some implementations of the method, it can include determining an intersection value of information represented by the second data structure and information represented by the third data structure using the second data structure and the third data structure.

In some implementations of the method, it can include further including determining a union value of the information represented by the second data structure and the information represented by the third data structure using the intersection value.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks) or intangible carrier media (e.g. communications signals). Aspects can also be implemented using suitable apparatus, which can take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
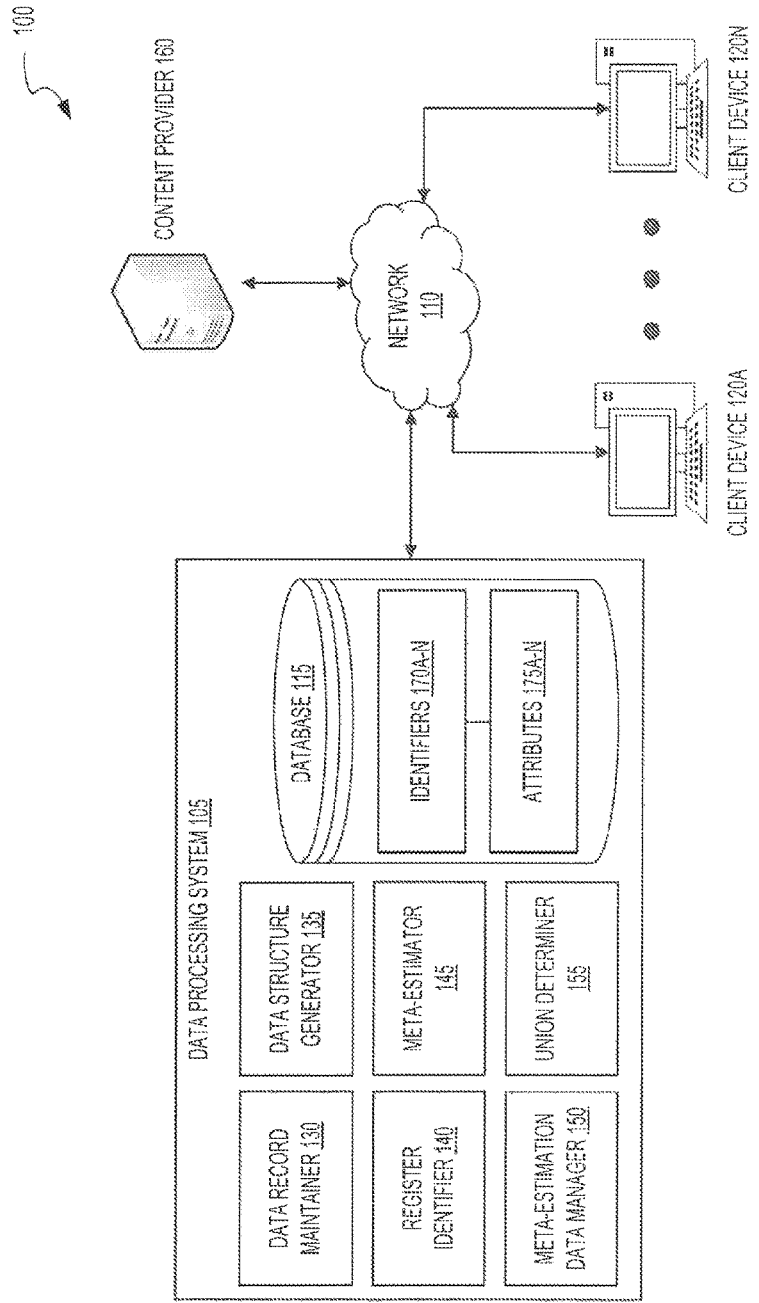
FIG. 1 illustrates a block diagram of an example system for meta-estimation of data structures representing large datasets.

Below are detailed descriptions of various concepts related to, and implementations of, techniques, approaches, methods, apparatuses, and systems for meta-estimation of data structures representing identifiers. The various concepts introduced above and discussed in greater detail below can be implemented in any of numerous ways, as the described concepts are not limited to any particular manner of implementation. Examples of specific implementations and applications are provided primarily for illustrative purposes.

Large datasets, such as those that represent groups of client device identifiers, can be difficult to represent efficiently. In particular, analysis of large datasets, such as those maintained by large content providers, is challenging to perform in a computationally efficient and privacy-preserving way. For example, certain content providers can store lists of client device identifiers in association with various attributes, such as demographic information (e.g., age, gender, location, interests, etc.), client device attributes such as device type, and other information received from client devices. Often, this information can include private or protected information. Content providers can generate data structures, or sketches, that represent the large datasets in a privacy-preserving manner. The sketches can be shared among other content providers for further analysis without revealing the information that each sketch represents.

However, sketch representations of large datasets, such as exponential bloom filter (EBF) sketches (sometimes referred to as LiquidLegions (LL) sketches or Any Distribution Bloom Filter (ADBF) sketches), or bloom filter (BF) sketches, among others, can be intrinsically vulnerable to certain attacks. Put simply, under certain circumstances, some data represented by such sketches can be retrieved from the sketch itself if certain precautions, such as distributed noise, are not incorporated at sketch generation. This poses a security risk to systems that generate and rely on such sketches. Other types of sketches, such as Vector-of-Counts (VoC) sketches, do not have this problem, and can improve the overall privacy and security of the information used to generate such sketches.

Nevertheless, generating VoC sketches using large sets of data can be more computationally intensive than generating exponential bloom filter sketches or bloom filter sketches. For example, unlike EBF or BF sketches, the data items used to generate a VoC sketch must first be de-duplicated prior to sketch generation. A de-duplication process can present massive computational overhead to the sketch generation process. In contrast, EBF or BF sketches do not require data de-duplication prior to sketch generation, making them more efficient to generate, but also more prone to privacy and security issues. Thus, it would be advantageous for a system to convert an EBF or BF sketch to a VoC sketch to gain the generation benefits of EBF or BF sketches while having the privacy and security advantages of VoC sketches.

The systems and methods of this technical solution provide such improvements. After generating an EBF or BF sketch, the systems and methods described herein can generate a VoC sketch that represents the information included in the EBF or BF sketches. After the VoC sketch has been generated, it can be safely transmitted to other computing systems for further processing, for example for use in calculating the intersection, union, or other set properties of datasets that are represented in similar VoC formats. The de-duplication process required to generate a VoC sketch from raw data items is significantly more computationally intensive than first generating an EBF or BF sketch and converting it to a VoC representation. Accordingly, the systems and methods of this technical solution provide a significant improvement to data processing systems that generate sketches for very large datasets.

A simplified example of one algorithm to perform the meta-estimation of a first EBF or BF sketch is included below in the pseudocode below for Algorithm 1.
Algorithm 1, in Pseudocode
Input: Stream of Objects O, class for sketches S (for example, S can be a VoC, or any other type of probabilistic data structure (e.g., HyperLogLog (HLL) sketch, BF sketch, EBF sketch, ADBF sketch, LL sketch, etc.).
Output: A sketch (e.g., a data structure including elements chosen to probabilistically represent an input set, etc.) of type 'S'.

---
Algorithm 1 Pseudocode Steps:
---
```
b = ADBF( )
for o in O:
    b.add(o);
s = S( );
for register_index in b:
    if b[register_index] == 1:
        s.add(register index)
return s
```
---

The output sketch, S, can be utilized in further processing operations, for example being used to determine the intersection (or the union) between other sketches having similar generation parameters (e.g., generated in the same manner over the same universe of identifiers, etc.). One way the sketches can be used is in Algorithm 2, which can be used to estimate the cardinality of the set of identifiers (e.g., or input set, etc.) from all original data streams that generated input sketches to Algorithm 1, above. One implementation of Algorithm 2 is described herein below in the following pseudocode. In the pseudocode for Algorithm 2, it should be understood that the "→" operation indicates a transformation from one data type to another. For example, "Set1→ABDF1→VoC1" can be understood to mean that a data set "Set 1" was used as an input to Algorithm 1 above to transform into an ABDF sketch "ABDF1", which was subsequently transformed into a VoC sketch "VoC1".
Algorithm 2, in Pseudocode
Input: A set of sketches, Z, created by Algorithm 1 with the same settings (e.g., the same input sketch type—as above, ABDF, but it should be understood that any other sketch type can be used.).
Output: Estimate of cardinality of union of all original streams (e.g., O's for each ABDF, etc.) from which the sketches Z were generated.

---
Algorithm 1 Pseudocode Steps:
---
```
Set1 → ADBF1 → VoC1
Set2 → ADBF2 → VoC2
VoC.estimate_union([VoC1, VoC2]) = number of ones in ABDF1 | ABDF2.
Cardinality(Set1 | Set2) = ADBF.estimate_from_ones(
    number of ones in ADBF1 | ADBF2).
Thus,
Cardinality(Set1 | Set2) =
ADBF.estimate_from_ones(VoC.estimate_union([VoC1, VoC2]))
```
---

In the pseudocode above, be understood that the "|" operator can correspond to a union operation. For example, in the context of a set, the "|" operator can correspond to a set union operation, and return a set containing the elements in Set1, the elements in Set2, and the elements in both Set1 and Set2. In the context of a sketch, such as an ADBF sketch, the "|" operator can correspond to an "or" operator, or more simply, a binary "OR" operation across all corresponding register positions in ADBF1 and ADBF2.

Prior to describing the systems and methods in detail, it may be helpful to consider the following pseudocode, which can resemble Python code. The following pseudocode presents various algorithms for the generation and manipulation of the data structures (e.g., ADBF sketches, VoC sketches, etc.) as described herein.

The pseudocode below provides algorithms and functions for the generation and manipulation of VoC sketches. The operations related to VoC sketches can be contained within a class, such as the VoCOps class shown below.

```
class VoCOps( ):
    def __init__(self, hash_func=default_hash_func, seeds=1):
        '''
        Creates VoC operations using the specified hash function.
        '''
        self.hash_func=hash_func
        self.seeds = [i for i in range(seeds)]
    def add(self, bit_vector, element):
        '''
        Adds an element to the bit_vector.
        bit_vector: bit vector to modify
        element: object to be consumed by the hash function.
        '''
        vector_size = len(bit_vector)
        for seed in self.seeds:
            bit_vector[self.hash_func(element,seed) % vector_size] += 1 /
                len(self.seeds)
    def estimated_length(self, bit_vector):
        return np.sum(bit_vector)
    def intersection(self, bit_vector1, bit_vector2):
        assert len(bit_vector1) == len(bit_vector2), "VoC vectors may
need to be same size for intersection"
        k = len(bit_vector1)
        n1 = self.estimated_length(bit_vector1)
        n2 = self.estimated_length(bit_vector2)
        return (np.sum((bit_vector1 - n1/k) * (bit_vector2 - n2/k))
            * len(self.seeds) * k / (k-1))
```

```
    def union(self, bit_vector1, bit_vector2):
        assert len(bit_vector1) == len(bit_vector2), "VoC vectors may
need to be the same size for union"
        a = self.estimated_length(bit_vector1)
        b = self.estimated_length(bit_vector2)
        return a + b - self.intersection(bit_vector1, bit_vector2)
```

As show in the above pseudocode, the VoCOps class can include functions that perform operations on VoC sketches (e.g., referred to as bit_vector, bit_vector1, bit_vector2, etc.). For example, at least one function to initialize the VoC operations, at least one function to add an element to a VoC sketch, at least one function to provide an estimated length of a VoC sketch, at least one function to return a number of intersecting elements of the sets of information represented by two VoC sketches, and at least one function that returns an estimated number of elements in the union of the sets of data represented by two VoC sketches.

Furthering the examples of various algorithms to perform the functionalities described herein, included below are algorithms and functions for the generation and manipulation of bloom filter data structures. The operations related to BF sketches can be contained within a class, such as the BloomFilterOps class shown below.

```
class BloomFilterOps:
    '''
    Defines BloomFilter-type actions.
    '''
    def __init__(self, num_hash_funcs, hash_func=default_hash_func):
        '''
        Creates a BloomFilter using the specified hash functions and
        the specified bit vector size.
        num_hash_funcs: number of hash functions to use.
        hash_func (function: (element, seed) -> integer): hash function
            to use for setting the bit vector.
        '''
        self.hash_func=hash_func
        self.seeds = [i for i in range(num_hash_funcs)]
    def add(self, bit_vector, element):
        '''
        Adds an element to this BloomFilter.
        bit_vector: bit vector to modify
        element: object to be consumed by the hash function.
        '''
        vector_size = len(bit_vector)
        for seed in self.seeds:
            bit_vector[self.hash_func(element, seed) % vector_size] = 1
    def contains(self, bit_vector, element):
        '''
        Checks for element membership. The false positive rate
        can be queried by calling false_positive_rate().
        '''
        vector_size = len(bit_vector)
        for seed in self.seeds:
            if not bit_vector[self.hash_func(element, seed) % vector_size]:
                return False
        return True
    def expected_false_positive_rate(self, bit_vector, expected_n):
        '''
        Queries the false positive rate of this Bloom Filter at the
        specified number of elements assuming uniform hash functions.
        If no arguments are given, checks the current estimated false
        positive rate of this Bloom Filter at its current capacity.
        '''
        vector_size = len(bit_vector)
        # Probability of a certain bit not being set to 1 by a hash function
        prob_bit_not_one = 1 - 1 / vector_size
        # Probability of a certain bit not being set to 1 by all hash functions
        prob_bit_not_one_all = prob_bit_not_one ** len(self.seeds)
        # Probability of a certain bit not being 1 after n elements
        prob_bit_not_one_n = prob_bit_not_one_all ** expected_n
        # Probability of a certain bit being 1
        prob_bit_one = 1 - prob_bit_not_one_n
```

```
  # Probability of a negative element colliding with all one bits
  return prob_bit_one ** len(self.seeds)
def estimated_length(self, bit_vector):
  return self.estimated_length_manual(np.sum(bit_vector), len(bit_vector))
def estimated_length_manual(self, num_ones, length):
  m = length
  if num_ones == m:
    return math.inf
  k = len(self.seeds)
  return -(m/k)*(math.log(1-num_ones/m))
def union(self, bit_vector1, bit_vector2):
  '''Returns the size of the bloom filter union of two bit vectors'''
  bit_vector3 = np.logical_or(bit_vector1, bit_vector2)
  return self.estimated_length(bit_vector3)
def intersection(self, bit_vector1, bit_vector2):
  '''Returns the size of the bloom filter intersection of two bit vectors'''
  return (self.estimated_length(bit_vector1) +\
      self.estimated_length(bit_vector2) -\
      self.union(bit_vector1, bit_vector2))
```

As show in the above pseudocode, the BloomFilterOps class can include functions that perform operations on BF sketches (e.g., referred to as bit_vector, bit_vector1, bit_vector2, etc.). For example, at least one function to initialize the BF sketch operations, at least one function to add an element to a BF sketch, at least one function to check if an element is in a BF sketch, at least one function that returns the false positive rate of BF sketch membership, at least one function to return an estimated length of the BF sketch, at least one function to return a number of intersecting elements of the sets of information represented by two BF sketches, and at least one function that returns an estimated number of elements in the union of the sets of data represented by two BF sketches.

Furthering the examples of various algorithms to perform the functionalities described herein, included below are algorithms and functions for the generation and manipulation of exponential bloom filter data structures. The operations related to EBF sketches can be contained within a class, such as the ExpBloomFilterOps class shown below.

```
class ExpBloomFilterOps:
  def __init__(self, decay_rate, hash_func=default_hash_func):
    self.hash_func = hash_func
    self.decay_rate = decay_rate
    self.seed = 0
    self.seeds =[0]
  def estimated_length(self, vector):
    return self.estimated_length_manual(sum(vector), len(vector))
  @lru_cache()
  def estimated_length_manual(self, num_ones, buckets):
    a = self.decay_rate
    def _expected_num_bits(reach):
      """Expected number of bits activated for cardinality."""
      if reach <= 0:
        return 0
      return (1 - (- special.expi(-a * reach / (np.exp(a) - 1)) +
          special.expi(-a * np.exp(a) * reach / (np.exp(a) - 1))) / a)
    def _clip(x, lower_bound, upper_bound):
      return max(min(x, upper_bound), lower_bound)
    x = num_ones
    m = buckets
    p = _clip(x / m, 0, 1)
    result = invert_monotonic(_expected_num_bits, epsilon=1e-7)(p) * m
    assert result >= 0, "Negative estimate should never happen."
    return result
  @lru_cache()
  def compute_register_probs(self, num_values):
    """Compute per register probability."""
    probs = np.exp(- self.decay_rate * (np.arange(num_values) + 1) /
        (num_values + 1))
    return np.cumsum(probs / np.sum(probs))
  def union(self, bit_vector1, bit_vector2):
    '''Returns the size of the bloom filter union of two bit vectors'''
    bit_vector3 = np.logical_or(bit_vector1, bit_vector2)
    return self.estimated_length(bit_vector3)
  def intersection(self, bit_vector1, bit_vector2):
    '''Returns the size of the bloom filter intersection of two bit vectors'''
    return (self.estimated_length(bit_vector1) +\
        self.estimated_length(bit_vector2) -\
        self.union(bit_vector1, bit_vector2))
```

```
def add(self, vector, element):
    float_hash = abs(int(self.hash_func(element, self.seed))) / 2147483647
    probs = self.compute_register_probs(len(vector))
    index = bisect.bisect_left(probs, float_hash) - 1
    vector[index] = 1
```

As show in the above pseudocode, the ExpBloomFilterOps class can include functions that perform operations on EBF sketches (e.g., referred to as bit_vector, bit_vector1, bit_vector2, etc.). For example, at least one function to initialize the EBF sketch operations, at least one function to add an element to an EBF sketch, at least one function to return per-register probabilities of population from a number of elements, at least one function to return an estimated length of an EBF sketch, at least one function to return a number of intersecting elements of the sets of information represented by two EBF sketches, and at least one function that returns an estimated number of elements in the union of the sets of data represented by two EBF sketches.

Although the algorithms and pseudocode above, which can be or be similar to python code, are shown at a high-level of generality, it should be understood that any of the computing devices described herein can perform any or any portion of the functionalities or operations described above. However, it should also be understood that the above pseudocode should not be considered as a limitation to the extent of the functionalities the computing devices described herein can perform.

Referring now to FIG. 1, illustrated is a block diagram of an example system 100 for meta-estimation of data structures representing identifiers, in accordance with one or more implementations. The system 100 can include at least one data processing system 105, at least one network 110, one or more client devices 120A-N (sometimes referred to as client device(s) 120), and at least one content provider 160. The data processing system 105 can include at least one data record maintainer 130, at least one data structure generator 135, at least one register identifier 140, at least one meta-estimator 145, at least one meta-estimation data manager 150, at least one union determiner 155, and at least one database 115. The database 115 can include one or more identifiers 170A-N (sometimes generally referred to as identifier(s) 170), and one or more attributes 175A-N (sometimes generally referred to as attribute(s) 175). In some implementations, the database 115 is external to the data processing system 105, and can be accessed by one or more of the computing devices described herein (e.g., the data processing system 105, the content provider 160, the client device 120, the computing system 400, etc.) via the network 110.

Each of the of the components (e.g., the data processing system 105, the network 110, the client devices 120A-N, the content provider 160, the data record maintainer 130, the data structure generator 135, the register identifier 140, the meta-estimator 145, the meta-estimation data manager 150, the union determiner 155, the database 115, etc.) of the system 100 can be implemented using the hardware components or a combination of software with the hardware components of a computing system (e.g., computing system 400, the data processing system 105, any other computing system described herein, etc.) detailed herein in conjunction with FIG. 400. Each of the components of the data processing system 105 can perform the functionalities detailed herein.

The data processing system 105 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The data processing system 105 can include one or more computing devices or servers that can perform various functions as described herein. The data processing system 105 can include any or all of the components and perform any or all of the functions of the computer system 400 described herein in conjunction with FIG. 4.

The network 110 can include computer networks such as the Internet, local, wide, metro or other area networks, intranets, satellite networks, other computer networks such as voice or data mobile phone communication networks, and combinations thereof. The data processing system 105 of the system 1 can communicate via the network 110, for instance with one or more client devices 120 or the content provider 160. The network 110 can be any form of computer network that can relay information between the client devices 120, the content provider 160, the data processing system 105, and one or more content sources, such as web servers, amongst others. In some implementations, the network 110 can include the Internet and/or other types of data networks, such as a local area network (LAN), a wide area network (WAN), a cellular network, a satellite network, or other types of data networks. The network 110 can also include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the computer system 400, etc.) can communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105, the computer system 400, etc.) can also communicate wirelessly with the computing devices of the network 110 via a proxy device (e.g., a router, network switch, or gateway).

Each of the one or more client devices 120 can each include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The client devices 120 can each include one or more computing devices or servers that can perform various functions as described herein. The client devices 120 can each include any or all of the components and perform any or all of the functions of the computer system 400 described herein in conjunction with FIG. 4.

Each of the client devices 120 can be computing devices (e.g., such as the computing device 400, etc.) configured to communicate via the network 110 to transmit or receive messages to or from the data processing system 105 or the content provider 160. The client devices 120 can be desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The client devices 120 can transmit one or more requests for content to a content publisher, a content provider 160, or data processing system 105. The client devices 120 can receive online content from the device to which the request was transmitted, where the content is selected based on device information (e.g., device model, device type, device operating system, device operating system version, device time, device date, any other context information described herein, etc.) about the client device 120 responsible for the request. The client devices 120 may be associated with various attributes and identifiers, which can be transmitted in requests for content or other messages to the content provider 160 or the data processing system 105. For example, a client device 120 can request an information resource from a content provider 160 or from the data processing system 105, can include a client device identifier and client device attributes in the request. The client devices 120 can receive responses to the transmitted requests (e.g., from the computing device to which the request was transmitted), which can include content requested by the client device 120.

The content provider 160 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content provider 160 can include one or more computing devices or servers that can perform various functions as described herein. The content provider 160 can include any or all of the components and perform any or all of the functions of the computer system 400 described herein in conjunction with FIG. 4.

The content provider 160 can provide one or more information resources, which can include, or include scripts to retrieve, content (e.g., text, images, audio, videos, any combination thereof, etc.). The content provider 160 can record which client devices access online content items, including the time, identifiers, and attributes of client devices that access the online content. The content provider 160 can provide content in response to one or more requests for content from client devices. For example, a client device 120 can request an information resource from the content provider 160, and the content provider can provide the information resource to the client device for display. The information resource can be a web-page, video, image, or any other type of content as described herein. The information resource provided by the content provider 160 can include one or more scripts, that when executed by the client device 120, cause the client device 120 to request additional content for insertion into the information resource. Thus, the content provider 160 can provide, and record client device 120 attributes and identifiers, on a one-to-one basis with requesting client devices 120. In some implementations, the data processing system 105 can be, or perform the same functionality as, the content provider 160. In some implementations, the content providers 160 can transmit client device identifiers and attributes extracted from content requests or from other messages to the data processing system 105.

The database 115 can be a database configured to store and/or maintain any of the information described herein. The database 115 can maintain one or more data structures, which can contain, index, or otherwise store each of the values, pluralities, sets, variables, vectors, or thresholds described herein. The database 115 can be accessed using one or more memory addresses, index values, or identifiers of any item, structure, or region maintained in the database 115. The database 115 can be accessed by the components of the data processing system 105, or any other computing device described herein, via the network 110. In some implementations, the database 115 can be internal to the data processing system 105. In some implementations, the database 115 can exist external to the data processing system 105, and can be accessed via the network 110. The database 115 can be distributed across many different computer systems or storage elements, and can be accessed via the network 110 or a suitable computer bus interface. The data processing system 105 can store, in one or more regions of the memory of the data processing system 105, or in the database 115, the results of any or all computations, determinations, selections, identifications, generations, constructions, or calculations in one or more data structures indexed or identified with appropriate values. Any or all values stored in the database 115 can be accessed by any computing device described herein, such as the data processing system 105, to perform any of the functionalities or functions described herein.

The database 115 can include one or more data records, which can be data structures that contain indexed information. One example of indexed data records are client device identifiers 170 (sometimes referred to as identifiers 170), which can be received from client devices 120 or from content providers 160. The identifiers 170 can be stored in association with client device attributes 175 (sometimes referred to generally as attributes 175). In some implementations, the attributes can be indexed in one or more data structures in the database 115 by a corresponding identifier 170. For example, an identifier 170 can point to or otherwise identify attributes 175 received from the client device 120 to which the identifier 170 corresponds.

The identifiers 170 that are maintained in the database 115 can be stored in one or more data structures, such as a list or indexed lookup table. Each of the identifiers 170 can be associated with one or more attributes 175 that describe aspects of a corresponding client device 120. Thus, each client device 120 can be associated with a respective identifier 170 and a respective one or more attributes 175. The attributes 175 can include attributes that are associated with a respective client device 120, and can be stored in one or more lists or indexed data structures in the database 115. The attributes 175 can include demographic information, such as age, gender, interests, and other demographic information, and can include location information at various granularities, including region information, coordinate information, or other types of location information, and can include device information such as device type, device operating system version, device network speed, and any other device information described herein. Each of the attributes 175 can be associated with at least one respective client device 120 and at least one respective identifier 170.

The data record maintainer 130 can maintain one or more data records including one or more identifiers 170 or one or more attributes 175. Data records can be data structures that store information in computer memory, and can include an identifier 170 or attributes 175 (e.g., of a client device 120, etc.). The data record maintainer 130 can receive messages from client devices 120, such as requests for content, and can extract from the messages an identifier 170 of the client device and attributes 175 of the client device. The data record maintainer 130 can generate a data record, such as a data structure (e.g., in the memory of the data processing system 105, etc.), to store the identifier 170 and the attributes 175 received from a client device 120. The data record can be stored the database 115. Each of the data records stored by the data record maintainer 130 can be associated with a location, address, or pointer to a location in the database 115 at which the respective data record resides. Using the location of the data record, the data record maintainer 130 (e.g., or any other component of the data processing system 105) can access the data records, and the identifiers 170 and attributes 175 included therein. In some implementations, the data record maintainer 130 stores the data records (e.g., and the identifiers 170 and the attributes 175, or any other data, etc.) in the memory of the data processing system 105.

The data structure generator 135 can generate a sketch data structure (e.g., a BF sketch, a EBF sketch, etc.) that represents one or more of the data records maintained by the data record maintainer 130. The sketch data structure can be a bloom filter data structure, having a first number of registers initialized to zero. A bloom filter can be a vector of registers (sometimes referred to as "buckets"), where each bucket is associated with a bucket identifier corresponding to its position, or index value, in the bloom filter. In some implementations, the bloom filter can be a bit string, where each position in the bit string serves as a register that can be set to zero or one. The bucket can have a value that is equal to zero or one. When initializing or generating a bloom filter, the data structure generator 135 can initialize the bloom filter buckets to an initialization value (e.g., zero, etc.). To add a data record to a bloom filter, the data structure generator can apply one or more hash functions (e.g., MD5, SHA-1, SHA-2, etc.) to the data record (e.g., to a data structure including an identifier 170 and attributes 175, etc.) to generate one or more hashed data records. The data structure generator 135 can extract a pointer from the hashed data records that points to one or more buckets of the bloom filter, and set the pointed-to buckets to a set value (e.g., one, etc.). The data structure generator 135 can repeat this process until all desired data records are included in the bloom filter. The data structure generator 135 can retrieve or otherwise access one or more parameters of the bloom filter when generating the sketch data structure. For example, the data structure generator 135 can receive, for example from an external computing device, parameters of the sketch to be generated. The parameters can include the type of hash function(s) used, the number of hash function(s) used, the number of buckets or positions in the bloom filter, or any other information required to generate the bloom filter. The cardinality of the dataset (e.g., the data records, etc.) used to generate a bloom filter can be estimated (e.g., by the data processing system or any of the components thereof, etc.) by evaluating:

$$n \approx -\frac{m}{k}\ln\left(1 - \frac{x}{k}\right),$$

where k is the number of hashes used to generate the bloom filter, m is the number of bits (e.g., buckets) in the bloom filter, x is the number of filled (e.g., set) buckets in the bloom filter, and n is the number of the estimate of the cardinality of the bloom filter.

In some implementations, the data structure generator 135 can generate an exponential bloom filter (EBF) as the sketch data structure. An exponential bloom filter (EBF) can be similar to a bloom filter data structure, except that each of the buckets or bits of the exponential data structure can be assigned a different range of probability values. In some implementations, the EBF can be a bit string, where each position in the bit string serves as a register (or bucket) that can be set to zero or one. When initializing or generating an EBF, the data structure generator 135 can initialize the bloom filter buckets to an initialization value (e.g., zero, etc.). For example, the probabilities assigned to each of the buckets of an EBF sketch can correspond to values of an exponential distribution, as shown in the "compute_register_probs" pseudocode function described herein above. By adjusting the decay rate of the exponential distribution of the EBF sketch, different probabilities (e.g., of bit population, etc.) can be determined. To add a data record to an EBF, the data structure generator 135 can calculate a hash value of the data record (e.g. using hash function on the data structure and its contents, etc.). The hash value can be converted into a number in the range [0, 1] (e.g., by dividing by the range of the output of the hash function, etc.). Because each of the buckets in the EBF correspond to a range of probabilities in the domain [0, 1], the data structure generator 135 can identify into which of the ranges of the probabilities that the converted hash value falls. The bucket associated with the corresponding range can then be set to a set value (e.g., 1).

This process can be repeated until all desired data records are added to the EBF sketch. Each position (e.g., bucket, register, etc.) in the bloom filter sketch or the EBF sketch can be identified by a corresponding index value.

The register identifier 140 can identify a subset of the registers in the sketch generated by the data structure generator 135 that are equal to a predetermined value, such as the set value. To do so, the register identifier 140 can iterate through each of the registers in the populated sketch (e.g., by index value, etc.), and identify a subset of the registers in the sketch that are set to the set value by comparing each register to a predetermined value (e.g., the set value, the unset value, etc.). The register identifier 140 can provide the index values of the registers in the subset to the meta-estimator 145 for further processing. For example, if positions 1, 9, and 83 in the sketch are identified as having set values, and the other positions in the sketch are not identified as having sketch values, the register identifier 140 can provide the indexes 1, 9, and 83 to the meta-estimator 145.

The meta-estimator 145 can generate a second data structure, such as a VoC sketch, that represents the index values of the subset of the registers in the sketch generated by the data structure generator 135. The VoC sketch can include counter registers that can be set to an unset value (e.g., zero), and that can be paed by the meta-estimator 145 when populating the VoC sketch. To initialize a VoC sketch, the meta-estimator can generate a VoC sketch having a predetermined (e.g., retrieved from a setting, or from another computing device, etc.) length (e.g., number of registers or buckets), where each register is initially set to an unset value (e.g., zero). To populate the VoC data structure, the meta-estimator can take an input value, such as an index value received from the register identifier 140, perform a hash function on the value to generate a hashed value. The meta-estimator 145 can then perform a modulus operation on the hashed value and the number of registers in the VoC sketch. The result of the modulus operation can have a value equal to an index value of one of the registers in the VoC sketch. The meta-estimator can increment the register associated with the index value equal to the modulus operation, thus populating the VoC sketch with the input value. The meta-estimator can repeat this process for each of the index values received from the register identifier 140, thereby generating a populated second data structure that represents the registers set to a set value in the bloom filter or exponential bloom filter sketch.

The meta-estimation data manager 150 can store the second data structure (e.g., the VoC sketch) that represents the subset of the registers of the bloom filter or exponential bloom filter in the memory of the data processing system 105. In some implementations, the meta-estimation data manager 150 can store the values in the database 115, in association with an identifier of the VoC sketch. In some implementations, the identifier of the VoC sketch can correspond to the set of data records (e.g., identifiers 170 and attributes 175) that were added to the initial bloom filter (or exponential bloom filter) sketch. In some implementations, the meta-estimation data manager 150 can transmit the VoC sketch to another computing device, such as a content provider 160 that requested the sketch, or to an external computing device that can aggregate sketches in a multi-party computation (MPC) protocol. In some implementations, the meta-estimation data manager 150 can receive a request for a VoC sketch that represents the meta estimation of a sketch generated from identifiers and attributes.

The request may identify an event, or attributes, or other parameters, of the identifiers 170 or the attributes 175 that should be included in the initial sketch. The meta-estimation data manager 150 can identify the data records (e.g., the identifiers 170 or attributes) that should be included in the initial sketch by scanning the database 115 for matching attributes 175. If matching attributes are identified, the meta-estimation data manager 150 can provide the identifier 170 associated with the matching attributes to the data structure generator 135 for inclusion in the initial (e.g., bloom filter, exponential bloom filter, etc.) sketch. In some implementations, the data records used to generate the initial sketch do not include any attributes 175, and are instead the identifiers 170 corresponding to attributes that match requirements in a request for a meta-estimation sketch. After the VoC sketch is generated, the meta-estimation data manager 150 can transmit the sketch to the computing device responsible for the request.

To compute the union value (e.g., the cardinality of the union of the sets of index values that were used to generate both VoC sketches, etc.) of two VoC sketches, the union determiner 155 can retrieve two VoC sketches generated from the same universe of data records (e.g., but may contain different data records) using the same parameters. To calculate the union value, the union determiner 155 can first determine an intersection value (e.g., the cardinality of the intersection of the sets of index values that were used to generate the two VoC sketches, etc.) for the two VoC sketches. To determine the intersection value, the union determiner 155 can determine the average register value (e.g., mean of the register values) in the first VoC sketch, and the average register value of the second VoC sketch. The average register value of the first VoC sketch can be subtracted from each register value in the first VoC sketch to generate a first normalized VoC sketch, and the average register value of the second VoC sketch can be subtracted from each register value in the second VoC sketch to generate a second normalized VoC sketch. Next, the dot product can be taken between the first normalized VoC sketch and the second normalized VoC sketch by multiplying each corresponding register in both normalized sketches, and summing to calculate the total of the resulting products. In some implementations, the union determiner 155 can multiply the resulting sum by an adjustment value equal to the number of positions in the first vector divided by one less than the number of positions in the first vector. In some implementations, an adjustment value is not used. The summed value, or the summed value multiplied by the adjustment value if used, can be the intersection value of the two VoC sketches.

The union determiner 155 can then use the intersection value to determine the cardinality of the union (e.g., the number of unique index values that contributed to both VoC sketches, etc.) of the index values that were used generate the two sketches. To do so, the union determiner 155 can estimate the number of index values that were used to generate the first sketch by summing the register values of the VoC sketch. The union determiner 155 can estimate the number of index values that were used to generate the second sketch in the same manner. To calculate the union value, the union determiner 155 can simply sum the estimated number of index values for the first VoC sketch and the estimated number of index values for the second VoC sketch, and subtract the intersection value. The resulting value is the union value, which represents the number of unique index values (or set registers in the initial sketches) in both VoC sketches.

Bloom filters and exponential bloom filters can be combined using an OR operation (e.g., all corresponding registers are OR'd together, etc.), Thus, the resulting union value of the two VoC sketches is an estimation of the total number of set values of a combination of the initial sketches used to generate the two VoC sketches. As the estimation of the cardinality of the data records that were used to generate the initial sketches depends only on the number of set values, the cardinality of the data records used to generate the initial sketches can be computed by evaluating:

$$n \approx -\frac{m}{k}\ln\left(1 - \frac{x}{k}\right),$$

where k is the number of hashes used to generate the bloom filter, m is the number of bits (e.g., buckets) in the bloom filter, x is the union value of the two VoC sketches, and n is the number of the estimate of the cardinality of the bloom filter.

Figure 2:
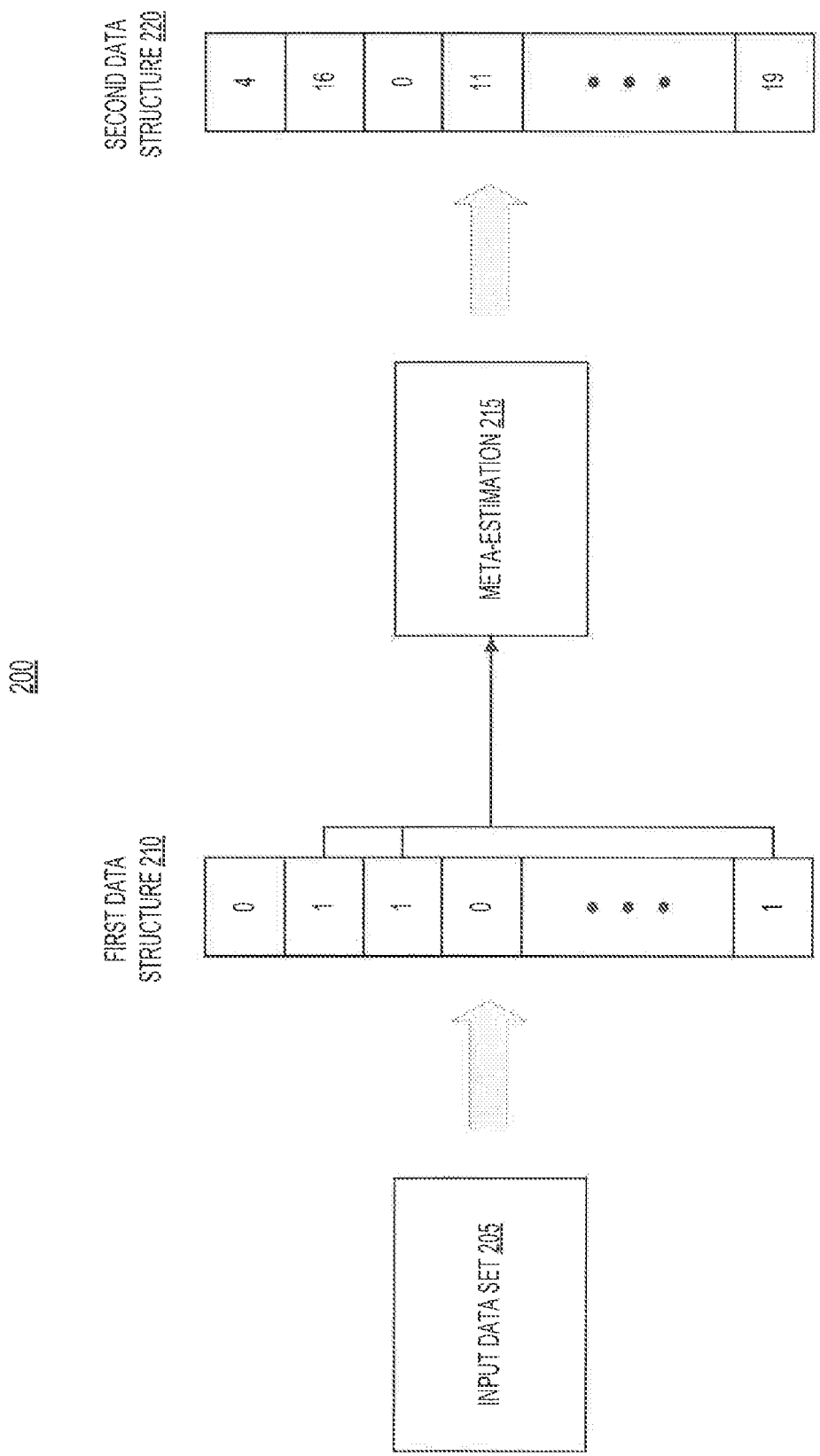
FIG. 2 illustrates a block diagram of an example data flow for the meta-estimation of data structures representing large datasets.

Referring briefly now to FIG. 2, depicted is a block diagram 200 of an example data flow for the meta-estimation of data structures representing large datasets. In the diagram, an input data set 205 can be converted into a first data structure 210, which can have registers set to unset of set values. In this diagram, "1" is a set value and "0" is an unset value. The index values of the set registers can be used in the meta-estimation 215 process described herein above (e.g., by the meta-estimator 145, etc.). The output of the meta-estimation 215 process can be a second data structure (e.g., VoC sketch, etc.). The second data structure can be made up of counter registers that can be incremented as described herein above.

Figure 3:
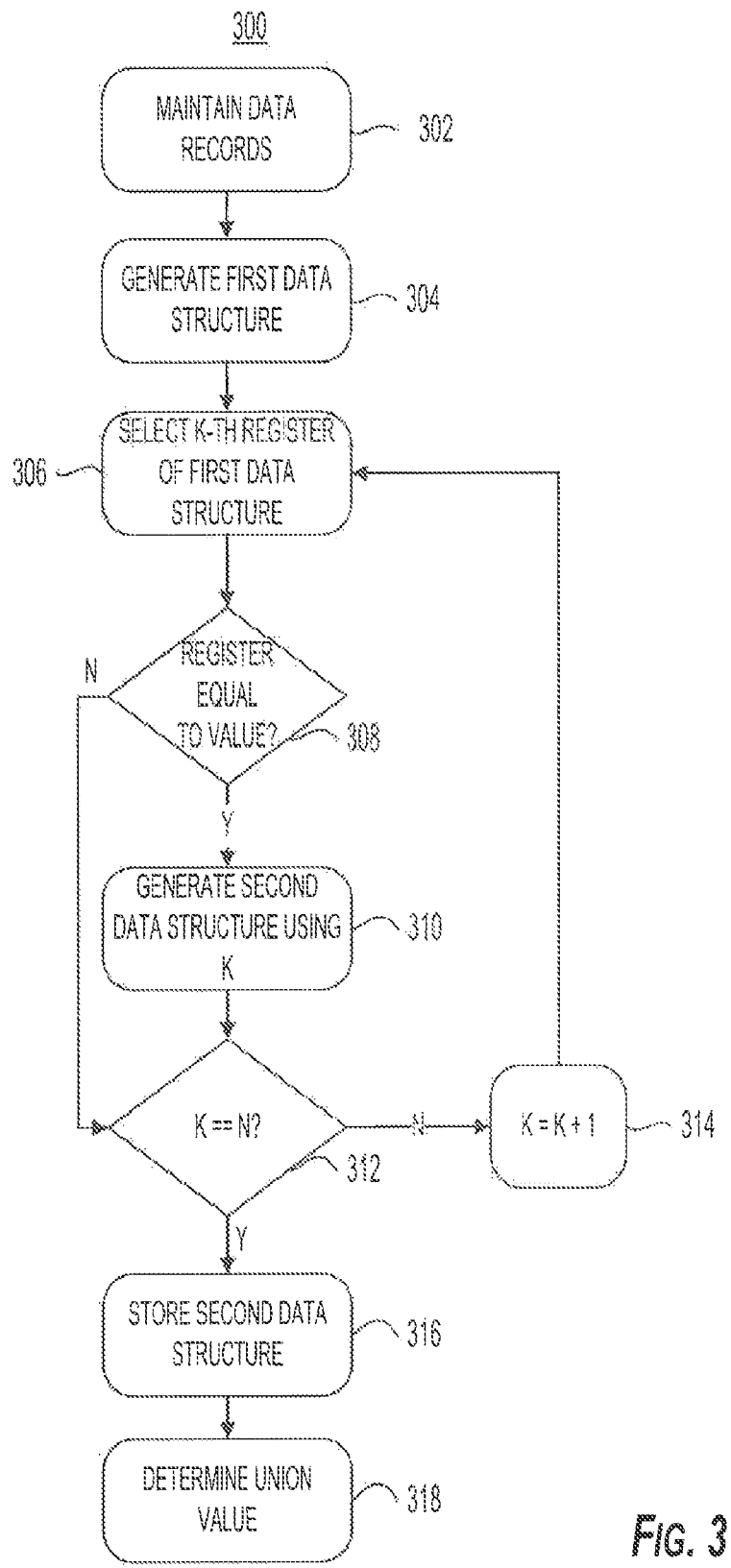
FIG. 3 illustrates a flow diagram of an example method for the meta-estimation of data structures representing large datasets.

Referring now to FIG. 3, depicted is an illustrative flow diagram of a method 300 for meta-estimation of data structures representing identifiers. The method 300 can be executed, performed, or otherwise carried out by the data processing system 105, the computer system 400 described herein in conjunction with FIG. 4, or any other computing devices described herein. In brief overview, the data processing system (e.g., the data processing system 105, any other computing device described herein, etc.) can maintain data records (STEP 302), generate a first data structure (STEP 304), select the k-th register of the first data structure (STEP 306), determine whether the register is equal to a predetermined value (STEP 308), generate a second data structure (STEP 310), determine whether the counter register k is equal to the number of registers in the first data structure n (STEP 312), increment the counter register k (STEP 314), store the second data structure (STEP 316), and determine a union value (STEP 318).

In further detail, the data processing system can maintain data records (STEP 302). The data processing system can maintain one or more data records including one or more identifiers (e.g., the identifiers 170, etc.) or one or more attributes (e.g., the attributes 175, etc.). Data records can be data structures that store information in computer memory, and can include an identifier or attributes of a client device (e.g., client device 120, etc.). The data processing system can receive messages from client devices, such as requests for content, and can extract from the messages an identifier of the client device or attributes of the client device. The data processing system can generate a data record, such as a data structure (e.g., in the memory of the data processing system, etc.), to store the identifier or the attributes received from a client device. The data record can be stored in a database (e.g., the database 115). Each of the data records stored by the data processing system can be associated with a location, address, or pointer to a location in the database or memory at which the respective data record resides. Using the location of the data record, the data processing system can access the data records, and the identifiers or attributes included therein. In some implementations, the data processing system stores the data records in the memory of the data processing system 105.

The data processing system can generate a first data structure (STEP 304). The data processing system can generate a sketch data structure (e.g., a BF sketch, a EBF sketch, etc.) that represents the one or more of the data records maintained by the data processing system as the first data structure. The sketch data structure can be a bloom filter data structure, having a first number of registers initialized to zero. A bloom filter can be a vector of registers (sometimes referred to as "buckets"), where each bucket is associated with a bucket identifier corresponding to its position, or index value, in the bloom filter. In some implementations, the bloom filter can be a bit string, where each position in the bit string serves as a register that can be set to zero or one. The bucket can have a value that is equal to zero or one. When initializing or generating a bloom filter, the data processing system can initialize the bloom filter buckets to an initialization value (e.g., zero, etc.). To add a data record to a bloom filter, the data processing system can apply one or more hash functions (e.g., MD5, SHA-1, SHA-2, etc.) to the data record to generate one or more hashed data records. The data processing system can extract a pointer from each of the hashed data records that points to one or more buckets of the bloom filter, and set the pointed-to buckets to a set value (e.g., one, etc.). The data processing system can repeat this process until all desired data records have been hashed and are represented in the bloom filter. The data processing system can retrieve or otherwise access one or more parameters of the bloom filter when generating the sketch data structure. For example, the data processing system can receive, for example from an external computing device, parameters of the sketch to be generated. The parameters can include the type of hash function(s) used, the number of hash function(s) used, the number of buckets or positions in the bloom filter, or any other information required to generate the bloom filter. The cardinality of the dataset (e.g., the data records, etc.) used to generate a bloom filter can be estimated (e.g., by the data processing system or any of the components thereof, etc.) by evaluating:

$$n \approx -\frac{m}{k}\ln\left(1 - \frac{x}{k}\right),$$

where k is the number of hashes used to generate the bloom filter, m is the number of bits (e.g., buckets) in the bloom filter, x is the number of filled (e.g., set) buckets in the bloom filter, and n is the number of the estimate of the cardinality of the bloom filter.

In some implementations, the data processing system can generate an exponential bloom filter (EBF) as the sketch data structure. An exponential bloom filter (EBF) can be similar to a bloom filter data structure, except that each of the buckets or bits of the exponential data structure can be assigned a different range of probability values. In some implementations, the EBF can be a bit string, where each position in the bit string serves as a register (or bucket) that can be set to zero or one. When initializing or generating an EBF, the data processing system can initialize the bloom filter buckets to an initialization value (e.g., zero, etc.). For example, the probabilities assigned to each of the buckets of an EBF sketch can correspond to values of an exponential distribution, as shown in the "compute_register_probs" pseudocode function described herein above. By adjusting the decay rate of the exponential distribution of the EBF sketch, different probabilities (e.g., of bit population, etc.) can be determined. To add a data record to an EBF, the data processing system can calculate a hash value of the data record (e.g. using hash function on the data structure and its contents, etc.). The hash value can be converted into a number in the range [0, 1] (e.g., by dividing by the range of the output of the hash function, etc.). Because each of the buckets in the EBF correspond to a range of probabilities in the domain [0, 1], the data processing system can identify into which of the ranges of the probabilities that the converted hash value falls. The bucket associated with the corresponding range can then be set to a set value (e.g., 1). This process can be repeated until all desired data records are added to the EBF sketch. Each position (e.g., bucket, register, etc.) in the bloom filter sketch or the EBF sketch can be identified by a corresponding index value.

The data processing system can select the k-th register of the first data structure (STEP 306). To populate a second data structure with the index values of the registers of the first data structure that are set to the set value, the data processing system can iteratively loop through each of the registers of the first data structure based on a counter register k. Each of the registers of the first data structure can be stored and indexed in a data structure by an index value (e.g., index 0, index 1, index 2, etc.). To populate the second data structure, the data processing system can select the register of the first data structure that is stored in association with an index value equal to the counter register k. If it is the first iteration of the loop, the counter register k may be initialized to an initialization value (e.g. k=0) before selecting the k-th register. Accessing the registers of the first data structure can include copying the data associated with the selected register of the first data structure to a different region of computer memory, for example a working region of memory in the data processing system.

The data processing system can determine whether the register is equal to a predetermined value (STEP 308). To do so, the data processing system can compare the value of the selected register to the set value (e.g., 1, etc.) to determine if index value of the register should be added to the second data structure. If the value of the register is equal to the set value, the data processing system can execute (STEP 310). If the value of the register is not equal to the set value, the data processing system can execute (STEP 312).

The data processing system can generate a second data structure (STEP 310). The data processing system can generate a second data structure, such as a VoC sketch, that represents the index values of the subset of the set registers in the first data structure. The VoC sketch can include counter registers that can be initialized to an unset value (e.g., zero), and that can be incremented by the data processing system when populating the VoC sketch. To initialize a VoC sketch, the data processing system can generate a VoC sketch having a predetermined (e.g., retrieved from a setting, or from another computing device, etc.) length (e.g., number of registers or buckets), where each register is initially set to an unset value (e.g., zero). To populate the VoC data structure, the data processing system can take an input value, such as the index value of the selected register, and perform a hash function on the selected index value to generate a hashed value. The data processing system can then perform a modulus operation on the hashed value and the number of registers in the VoC sketch. The result of the modulus operation can have a value equal to an index value of one of the registers in the VoC sketch. The data processing system can increment the register associated with the index value equal to the modulus operation, thus populating the VoC sketch with the selected index value.

The data processing system can determine whether the counter register k is equal to the number of registers in the first data structure n (STEP 312). To determine whether all of the index values in the first data structure have been considered by the data processing system, the data processing system can compare the counter register used to select each register in the first data structure to the total number of registers in the first data structure n. If the counter register k is not equal to (e.g., less than) the total number of registers in the first data structure n, the data processing system can execute (STEP 314). If the counter register k is equal to (e.g., equal to or greater than) the total number of registers in the first data structure n, the data processing system can execute (STEP 316).

The data processing system can increment the counter register k (STEP 314). To consider each register in the first data structure for addition into the second data structure, the data processing system can add one to the counter register k to indicate the number of registers in the first data structure that have been considered for addition into the second data structure. In some implementations, the data processing system can set the counter register k to a memory address value (e.g., location in computer memory) of the next location in memory of the next register in the first data structure. If this is the first iteration of this loop, the data processing system can initialize the counter register k to an initial value, for example zero, before incrementing the counter register. After incrementing the value of the counter register k, the data processing system can execute (STEP 306).

The data processing system can store the second data structure (STEP 316). The data processing system can store the second data structure (e.g., the VoC sketch) that represents the selected subset of the registers of the first data structure (e.g., bloom filter or exponential bloom filter, etc.) in the memory of the data processing system. In some implementations, the data processing system can store the values in a database (e.g., the database 115, etc.), in association with an identifier of the second data structure (e.g., the VoC sketch, etc.). In some implementations, the identifier of the second data structure can correspond to the set of data records (e.g., identifiers 170 or attributes 175) that were added to the first data structure. In some implementations, the data processing system can transmit the second data structure to another computing device, such as a content provider (e.g., the content provider 160, etc.) that requested the second data structure, or to an external computing device that can aggregate sketches in a multi-party computation (MPC) protocol. In some implementations, the data processing system can receive a request for a VoC sketch that represents the meta estimation of a sketch generated from identifiers that are associated with specified attributes.

The data processing system can determine a union value (STEP 318). To compute the union value (e.g., the cardinality of the union of the sets of index values that were used to generate both VoC sketches, etc.) of two VoC sketches, the data processing system can retrieve two VoC sketches generated from the same universe of data records (e.g., but may contain different data records) using the same parameters. To calculate the union value, the data processing system can first determine an intersection value (e.g., the cardinality of the intersection of the sets of index values that were used to generate the two VoC sketches, etc.) for the two VoC sketches. To determine the intersection value, the data processing system can determine the average register value (e.g., mean of the register values) in the first VoC sketch, and the average register value of the second VoC sketch. The average register value of the first VoC sketch can be subtracted from each register value in the first VoC sketch to generate a first normalized VoC sketch, and the average register value of the second VoC sketch can be subtracted from each register value in the second VoC sketch to generate a second normalized VoC sketch. Next, the dot product can be taken between the first normalized VoC sketch and the second normalized VoC sketch by multiplying each corresponding register in both normalized sketches, and summing to calculate the total of the resulting products. In some implementations, the data processing system can multiply the resulting sum by an adjustment value equal to the number of positions in the first vector divided by one less than the number of positions in the first vector. In some implementations, an adjustment value is not used. The summed value, or the summed value multiplied by the adjustment value if used, can be the intersection value of the two VoC sketches.

The data processing system can then use the intersection value to determine the cardinality of the union (e.g., the number of unique index values that contributed to both VoC sketches, etc.) of the index values that were used generate the two sketches. To do so, the data processing system can estimate the number of index values that were used to generate the first sketch by summing the register values of the VoC sketch. The data processing system can estimate the number of index values that were used to generate the second sketch in the same manner. To calculate the union value, the data processing system can simply sum the estimated number of index values for the first VoC sketch and the estimated number of index values for the second VoC sketch, and subtract the intersection value. The resulting value is the union value, which represents the number of unique index values (or set registers in the initial sketches) in both VoC sketches.

Figure 4:
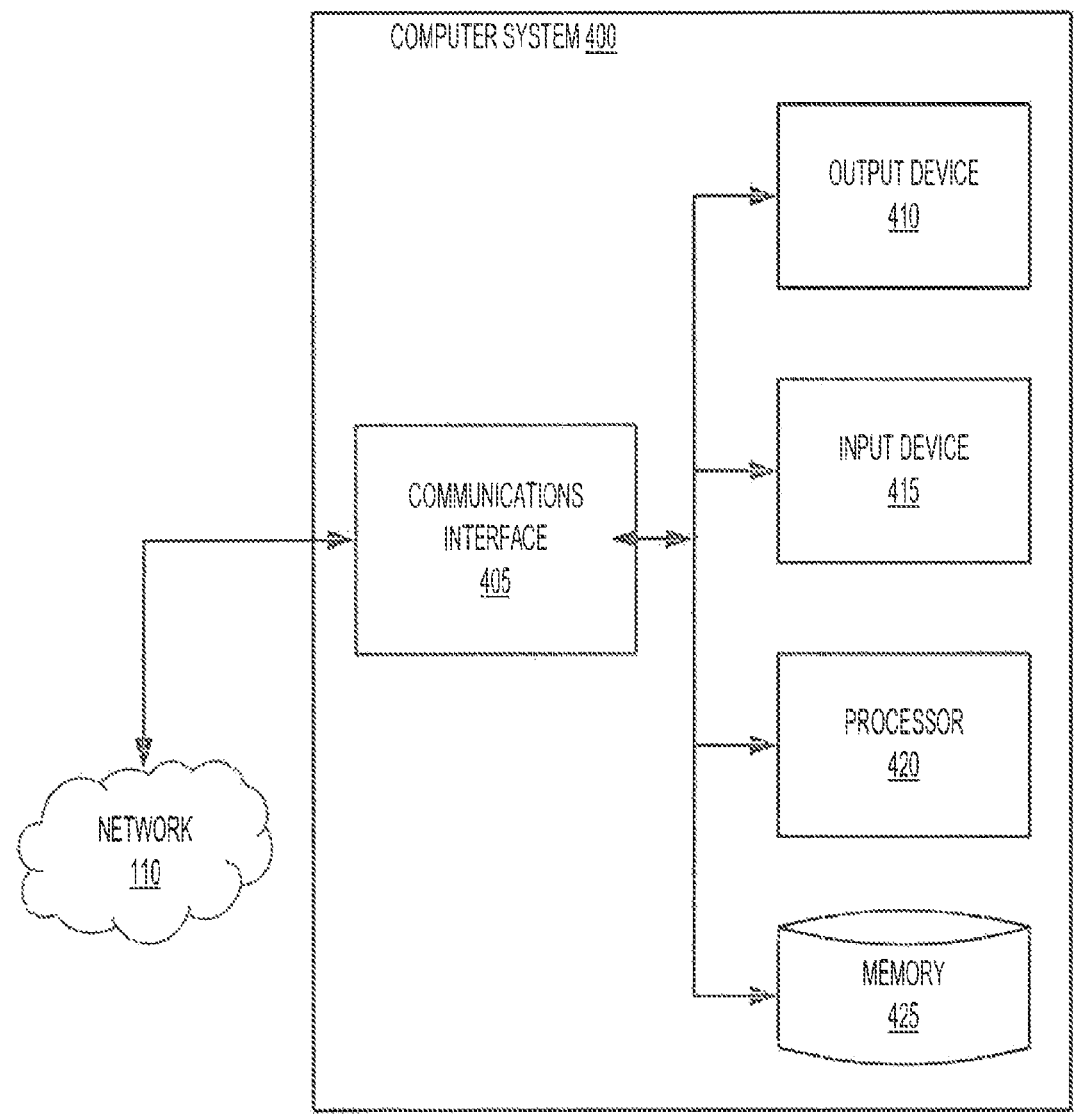
FIG. 4 illustrates the general architecture of an illustrative computer system that can be employed to implement any of the computers discussed herein.

FIG. 4 shows the general architecture of an illustrative computer system 400 that can be employed to implement any of the computer systems discussed herein in accordance with some implementations. The computer system 400 can be used to provide information via the network 110 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in any of the computing device described herein.

In the computer system 400 of FIG. 4, the memory 425 can comprise any computer-readable storage media, and can store computer instructions such as processor-executable instructions for implementing the various functionalities described herein for respective systems, as well as any data relating thereto, generated thereby, or received via the communications interface(s) or input device(s) (if present). Referring again to the system 400 of FIG. 4, the computer system 400 can include the memory 425 to store information any of the information, variables, vectors, data structures, or other computer-readable information described herein, among others. The processor(s) 420 shown in FIG. 4 can be used to execute instructions stored in the memory 425 and, in so doing, also can read from or write to the memory various information processed and or generated pursuant to execution of the instructions.

The processor 420 of the computer system 400 shown in FIG. 4 also can be communicatively coupled to or control the communications interface(s) 405 to transmit or receive various information pursuant to execution of instructions. For example, the communications interface(s) 405 can be coupled to a wired or wireless network, bus, or other communication means and can therefore allow the computer system 400 to transmit information to or receive information from other devices (e.g., other computer systems). While not shown explicitly in the system of FIG. 4, one or more communications interfaces facilitate information flow between the components of the system 400. In some implementations, the communications interface(s) can be configured (e.g., via various hardware components or software components) to provide a website as an access portal to at least some aspects of the computer system 400. Examples of communications interfaces 405 include user interfaces (e.g., web pages), through which the user can communicate with the computer system 400.

The output devices 410 of the computer system 400 shown in FIG. 4 can be provided, for example, to allow various information to be viewed or otherwise perceived in connection with execution of the instructions. The input device(s) 415 can be provided, for example, to allow a user to make manual adjustments, make selections, enter data, or interact in any of a variety of manners with the processor during execution of the instructions. Additional information relating to a general computer system architecture that can be employed for various systems discussed herein is provided further herein.

Described below are various experimental results related to the meta-estimation of bloom filters and exponential bloom filters using vectors-of-counts. It should be understood that this is example data only, and should be construed as limiting any aspect of the systems and methods described herein.

Figure 5:
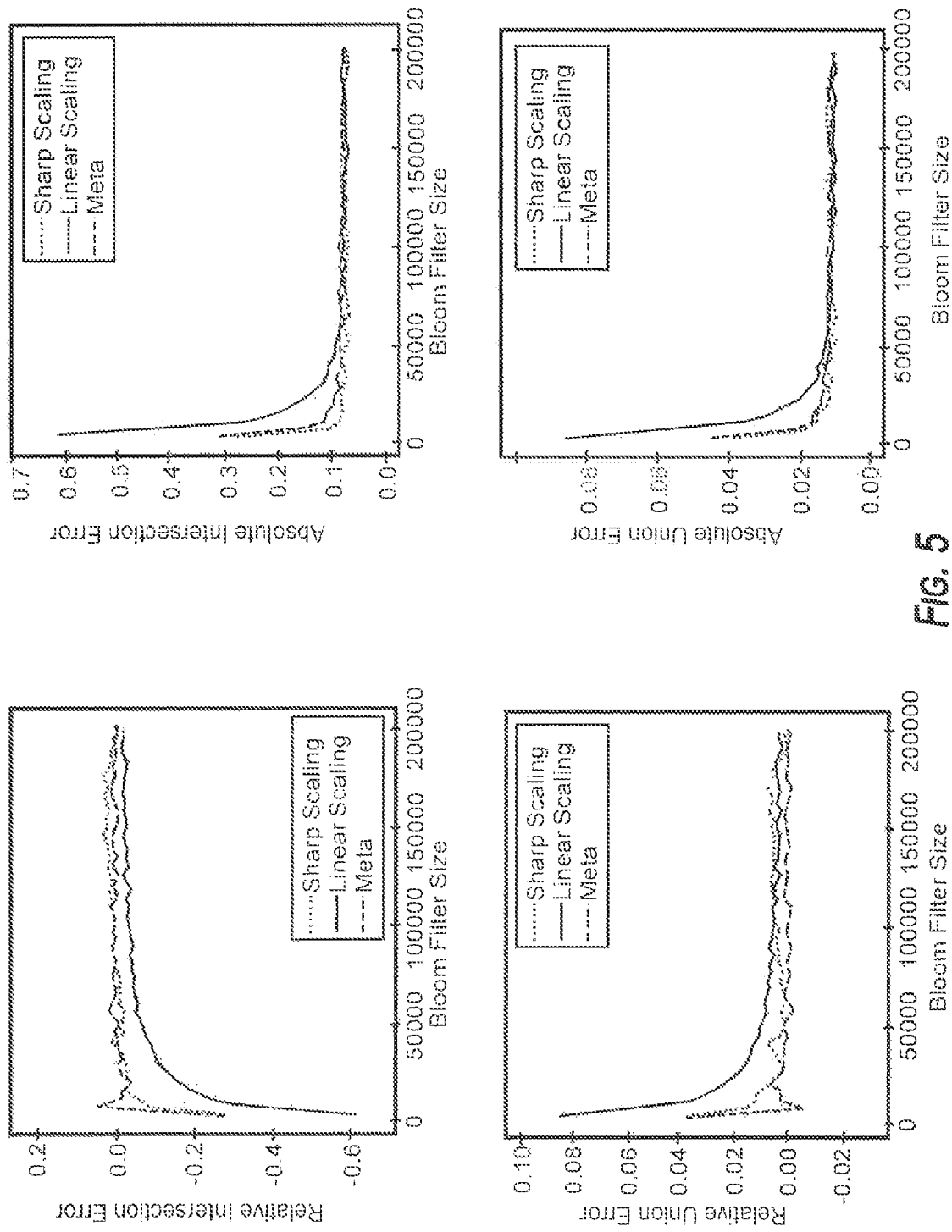
FIG. 5 depicts graphs showing example experimental data including error and bias as bloom filter size increases.

Referring now to FIG. 5, depicted are graphs showing example experimental data including error and bias as bloom filter size increases. The parameters and functions used to generate the graphs in FIG. 5 are represented below in the following pseudocode, which may be similar to Python code.

```
num_hash = 1
num_trials = 500
size_bounds = (2048 * 2, 2048 * 100)
bf_size_range = list(range(*size_bounds, 2048 * 2))
voc_size = 2048
bf = BloomFilterOps(num_hash)
methods = [('Sharp Scaling', norm(bf.bf_to_voc_sharp_scaling(muted=False))),
    # ('Muted Scaling', norm(bf.bf_to_voc_sharp_scaling(muted=True))),
        ('Linear Scaling', norm(bf.bf_to_voc_scaling)),
```

```
        # ('Sharp Meta', folded_bloom_filter(bf.bf_to_voc_sharp_scaling(muted=False))),
            ('Meta', folded_bloom_filter(bf.bf_to_voc_meta)),
        # ('Modded Transform', folded_bloom_filter(bf.bf_to_voc_modded_transform)),
    ]
    true_intersection_size = 1000
    true_set_size = 4096
    run_experiment("Bloom Filter Size", num_trials, bf_size_range, methods, [bf],
            [true_intersection_size], [true_set_size], bf_size_range, [voc_size])
```

As shown in FIG. 5, meta-estimation generally outperforms other techniques for bloom filter to VoC conversion with respect to error and bias as the size (number of registers) of the bloom filter increases.

Figure 6:
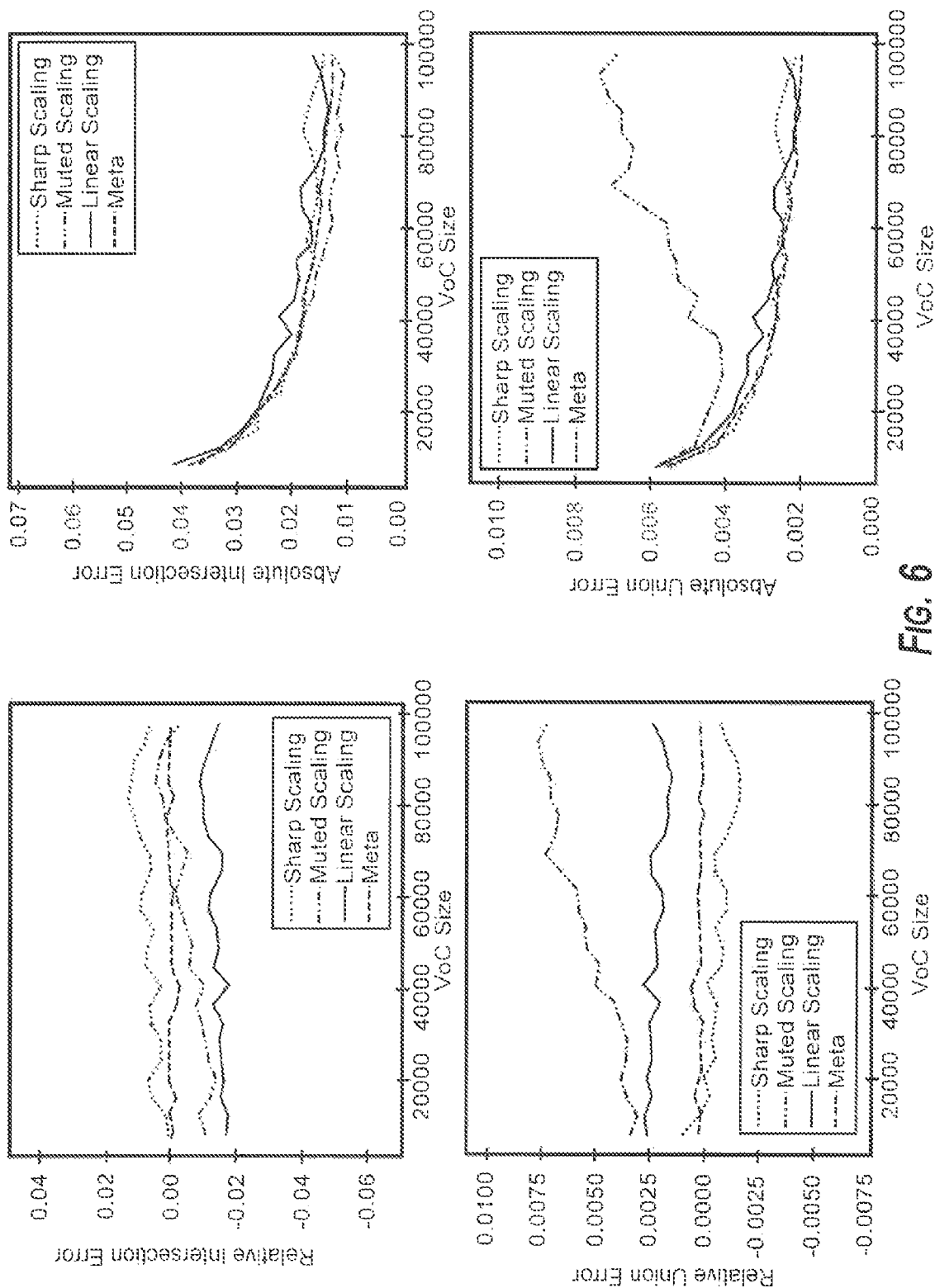
FIG. 6 depicts graphs showing example experimental data including error and bias as VoC sketch size increases.

Referring now to FIG. 6, depicted are graphs showing example experimental data including error and bias as VoC sketch size increases. The parameters and functions used to generate the graphs in FIG. 6 are represented below in the following pseudocode, which may be similar to Python code

```
    num_hash = 1
    num_trials = 1000
    size_bounds = (2048 * 4, 2048 * 50)
    voc_size_range = list(range(*size_bounds, 2048 * 2))
    bf_size = 2048 * 100
    bf = BloomFilterOps(num_hash)
    methods = [
        ('Sharp Scaling', norm(bf.bf_to_voc_sharp_scaling(muted=False))),
        ('Muted Scaling', norm(bf.bf_to_voc_sharp_scaling(muted=True))),
        ('Linear Scaling', norm(bf.bf_to_voc_scaling)),
        ('Meta', meta_voc)
    ]
    true_set_size = 4096
    true_intersection_size = 1000
    run_experiment("VoC Size", num_trials, voc_size_range, methods, [bf],
            [true_intersection_size], [true_set_size], [bf_size],
        voc_size_range)
```

As shown in FIG. 6, meta-estimation generally outperforms other techniques for bloom filter to VoC conversion with respect to error and bias as the size (number of registers) of the VoC sketch increases.

Figure 7:
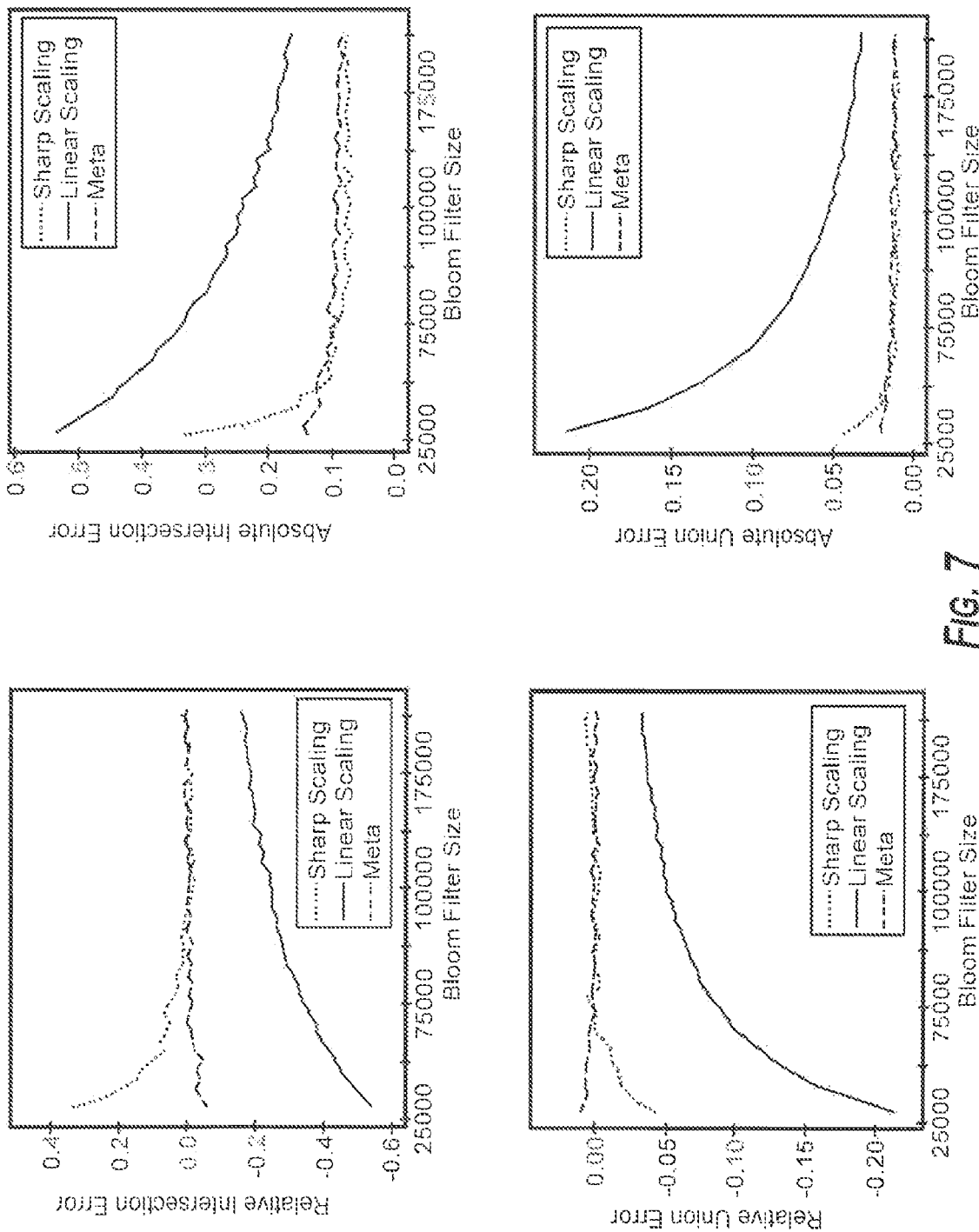
FIG. 7 depicts graphs showing example experimental data including error and bias as bloom filter size increases for an exponential bloom filter implementation.

Referring now to FIG. 7, depicted are graphs showing example experimental data including error and bias as bloom filter size increases for an exponential bloom filter implementation.

```
    num_trials = 250
    size_bounds = (2048 * 15, 2048 * 100)
    bf_size_range = list(range(*size_bounds, 2048 * 2))
    voc_size = 2048
    ebf = ExpBloomFilterOps(10)
    bf = BloomFilterOps(1)
    methods = [('Sharp Scaling',
            exp_bloom_filter(ebf.ebf_to_voc_sharp_scaling(muted=False),
            meta=False)),
        ('Linear Scaling',
            exp_bloom_filter(ebf.ebf_to_voc_modded_transform, meta=False)),
        ('Meta',
            exp_bloom_filter(bf.bf_to_voc_meta, meta=True))
    ]
    true intersection size = 1000
    true_set_size = 4096
    run_experiment("Bloom Filter Size", num_trials, bf_size_range, methods, [ebf],
        [true_intersection_size], [true_set_size], bf_size_range, [voc_size])
```

As shown in FIG. 7, meta-estimation of exponential bloom filters performs competitively with other techniques for exponential bloom filter to VoC conversion with respect to error and bias as the size (number of registers) of the bloom filter sketch increases. However, meta-estimation is much more computationally efficient than other implementations, making the difference in relative error negligible for large datasets.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein can be implemented on a smart television module (or connected television module, hybrid television module, etc.), which can include a processing module configured to integrate internet connectivity with more traditional television programming sources (e.g., received via cable, satellite, over-the-air, or other signals). The smart television module can be physically incorporated into a television set or can include a separate device such as a set-top box, Blu-ray or other digital media player, game console, hotel television system, and other companion device. A smart television module can be configured to allow viewers to search and find videos, movies, photos and other content on the web, on a local cable TV channel, on a satellite TV channel, or stored on a local hard drive. A set-top box (STB) or set-top unit (STU) can include an information appliance device that can contain a tuner and connect to a television set and an external source of signal, turning the signal into content which is then displayed on the television screen or other display device. A smart television module can be configured to provide a home screen or top level screen including icons for a plurality of different applications, such as a web browser and a plurality of streaming media services, a connected cable or satellite media source, other web "channels", etc. The smart television module can further be configured to provide an electronic programming guide to the user. A companion application to the smart television module can be operable on a mobile computing device to provide additional information about available programs to a user, to allow the user to control the smart television module, etc. In alternate implementations, the features can be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what can be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided can be useful for meta-estimation of data structures representing identifiers, the systems and methods described herein can be applied to other environments. The foregoing implementations are illustrative rather than limiting of the described systems and methods. The scope of the systems and methods described herein can thus be indicated by the appended claims, rather than the foregoing description, and changes that come within the meaning and range of equivalency of the claims are embraced therein.

What is claimed is:

1. A system for improving data sketch processing in data processing systems, comprising:
one or more processors; and
one or more memory devices storing computer-readable instructions that, when implemented, cause the one or more processors to perform operations, the operations comprising:
retrieving one or more generation parameters corresponding to a first initial sketch comprising a plurality of first initial sketch registers, wherein a subset of the plurality of first initial sketch registers are populated according to the one or more generation parameters and based at least in part on hashes of a plurality of data records;
retrieving a first meta-estimation sketch comprising a plurality of first meta-estimation sketch registers populated based at least in part on hashes of index values of each of the subset of the plurality of first initial sketch registers; and
determining, using the one or more generation parameters, one or more set properties using the first meta-estimation sketch and a second meta-estimation sketch.

2. The system of claim 1, wherein the second meta-estimation sketch comprises a plurality of second meta-estimation sketch registers populated based at least in part on hashes of index values of each of a subset of a plurality of second initial sketch registers of a second initial sketch.

3. The system of claim 2, wherein the one or more set properties comprise a cardinality estimate of a union of the first initial sketch and the second initial sketch.

4. The system of claim 1, wherein determining the one or more set properties comprises determining an intersection of the first meta-estimation sketch and the second meta-estimation sketch.

5. The system of claim 1, wherein determining the one or more set properties comprises determining a union of the first meta-estimation sketch and the second meta-estimation sketch.

6. The system of claim 1, wherein the first initial sketch is a bloom filter sketch.

7. The system of claim 1, wherein the first initial sketch is an exponential bloom filter sketch.

8. The system of claim 1, wherein the plurality of data records corresponds to a plurality of identifiers associated with one or more attributes.

9. The system of claim 1, wherein the operations further comprise:
generating the first meta-estimation sketch by, for a respective index value of the index values of each of the subset of the plurality of first initial sketch registers:
determining a respective first meta-estimation sketch index based on hashing the respective index value; and
incrementing a respective one of the plurality of first meta-estimation sketch registers associated with the respective first meta-estimation sketch index.

10. A system for improving data sketch processing in data processing systems, comprising:
one or more processors; and
one or more memory devices storing computer-readable instructions that, when implemented, cause the one or more processors to perform operations, the operations comprising:
generating a first initial sketch comprising a plurality of first initial sketch registers, wherein a subset of the plurality of first initial sketch registers are populated according to one or more generation parameters and based at least in part on hashes of a plurality of data records; and
generating a first meta-estimation sketch comprising a plurality of first meta-estimation sketch registers populated based at least in part on hashes of index values of each of the subset of the plurality of first initial sketch registers.

11. The system of claim 10, wherein the first initial sketch is a bloom filter sketch.

12. The system of claim 10, wherein the plurality of data records corresponds to a plurality of identifiers associated with one or more attributes.

13. The system of claim 10, wherein the operations further comprise:
generating the first meta-estimation sketch by, for a respective index value of the index values of each of the subset of the plurality of first initial sketch registers:
determining a respective first meta-estimation sketch index based on hashing the respective index value; and
incrementing a respective one of the plurality of first meta-estimation sketch registers associated with the respective first meta-estimation sketch index.

14. The system of claim 10, wherein the operations further comprise:
receiving, from a computing device, a meta-estimation sketch request; and
transmitting, to the computing device and responsive to the meta-estimation sketch request, the first meta-estimation sketch.

15. The system of claim 14, wherein the meta-estimation sketch request identifies at least one parameter for the identifiers or the attributes to be represented in the first initial sketch.

16. The system of claim 14, wherein the meta-estimation sketch request contains the one or more generation parameters of the first initial sketch.

17. The system of claim 10, wherein the one or more generation parameters include at least one parameter selected from a type of hash function used, a number of hash functions used, and a number of registers.

18. A method for improving data sketch processing in data processing systems, comprising:
maintaining, by a data processing system comprising one or more processors and a memory, a plurality of data records comprising a plurality of identifiers and one or more attributes;
generating, by the data processing system, a first data structure that represents the plurality of data records, the first data structure having a plurality of first registers, wherein at least one of the plurality of first registers is populated based on hashes of each of the plurality of identifiers;

identifying, by the data processing system, a subset of the plurality of first registers that are equal to a predetermined value, each of the subset of the plurality of first registers identified by an index value;

generating, by the data processing system, a second data structure that represents the subset of the plurality of first registers, the second data structure having a plurality of second registers, wherein at least one of the plurality of second registers is populated based on hashes of the index values of each of the subset of the plurality of first registers; and storing, by the data processing system, in the memory, the second data structure that represents the subset of the plurality of first registers.

19. The method of claim 18, further comprising:

retrieving, by the data processing system, a third data structure having a plurality of third registers, each of the plurality of third registers corresponding to a respective one of the plurality of second registers of the second data structure; and determining, by the data processing system, an intersection value of information represented by the second data structure and information represented by the third data structure using the second data structure and the third data structure.

20. The method of claim 19, further comprising determining, by the data processing system, a union value of the information represented by the second data structure and the information represented by the third data structure using the intersection value.

* * * * *